United States Patent [19]
Peltier

[11] 4,061,062
[45] Dec. 6, 1977

[54] METHOD AND A DEVICE FOR THE AUTOMATIC REPLACEMENT OF A WORKPIECE TO BE MACHINED ON A MACHINE-TOOL

[75] Inventor: François Peltier, Ruelle, France

[73] Assignee: Moteurs Leroy-Somer, Angouleme, France

[21] Appl. No.: 760,375

[22] Filed: Jan. 18, 1977

[30] Foreign Application Priority Data
Jan. 29, 1976  France ................... 76.02394

[51] Int. Cl.² .............. B23B 13/00; B23B 5/28; B25J 3/00
[52] U.S. Cl. ........................... 82/2.7; 82/8; 214/1 B; 214/1 BB; 214/1 BD; 82/1 C
[58] Field of Search ............ 82/2.5, 2.7, 8, 9, 1 C; 214/1 R, 1 B, 1 BB, 1 BC, 1 BD

[56] References Cited

U.S. PATENT DOCUMENTS

| 1,933,226 | 10/1933 | Smith et al. .................. 82/2.7 |
| 2,004,540 | 6/1935 | Smith et al. .................. 82/2.7 X |
| 2,305,868 | 12/1942 | Groene et al. ................ 82/8 X |
| 2,554,699 | 5/1951 | Gamble ....................... 82/2.7 X |
| 3,028,020 | 4/1962 | Peras ......................... 82/2.7 X |
| 3,124,257 | 3/1964 | Price et al. .................. 241/1 BD |

*Primary Examiner*—Harrison L. Hinson
*Attorney, Agent, or Firm*—Young & Thompson

[57] ABSTRACT

Two superposed and rigidly associated cradles are brought into position opposite a magazine for unmachined workpieces. One of the cradles is loaded by extracting an unmachined workpiece from the magazine. The cradles are moved towards the work axis, the unloading cradle is brought into position beneath the finished workpiece which drops into the cradle under the action of gravity. The two cradles are displaced so as to bring the unmachined workpiece into position along the work axis on which it is clamped between centers, and the two cradles are then moved away from the work axis.

21 Claims, 26 Drawing Figures

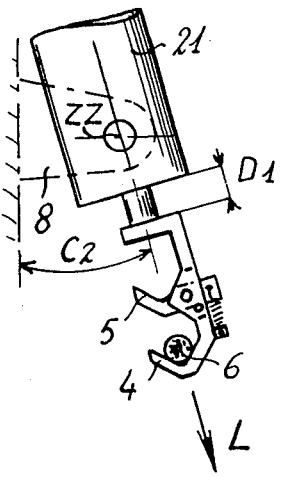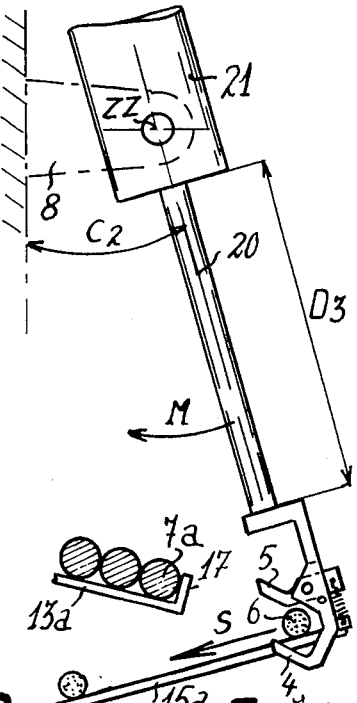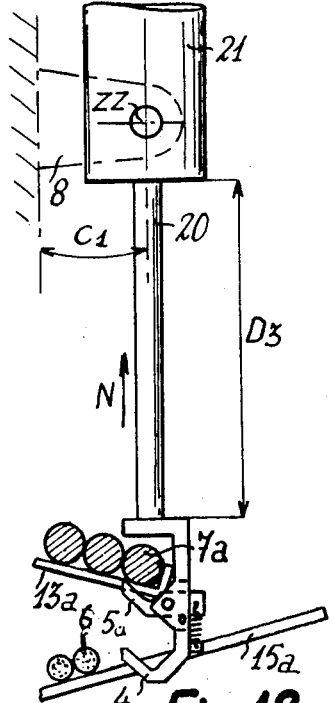
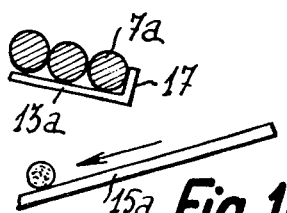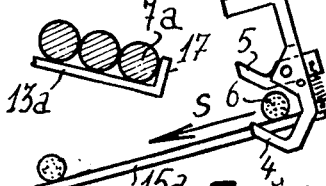
Fig. 10  Fig. 11  Fig. 12
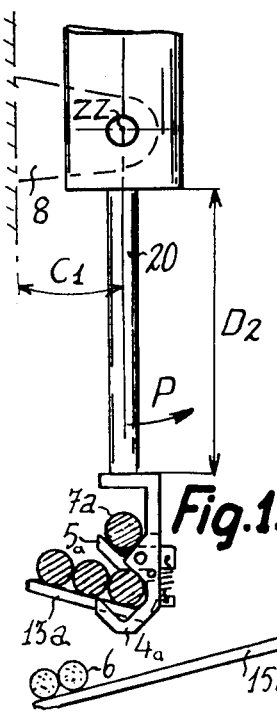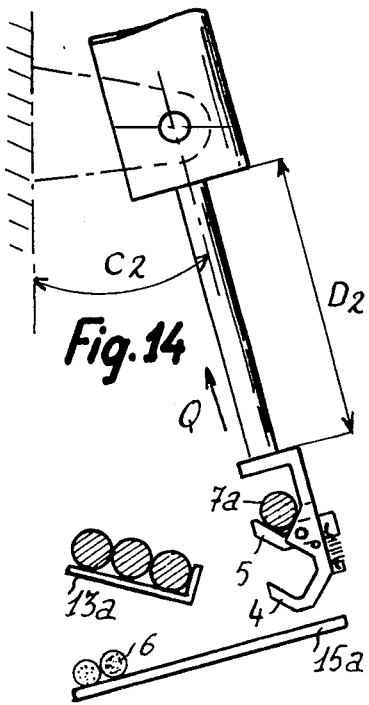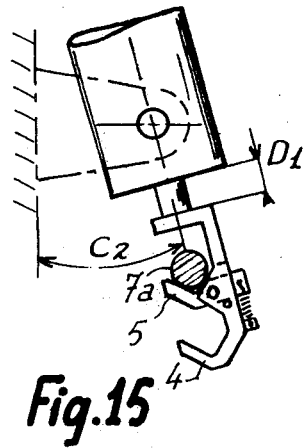
Fig. 13  Fig. 14  Fig. 15

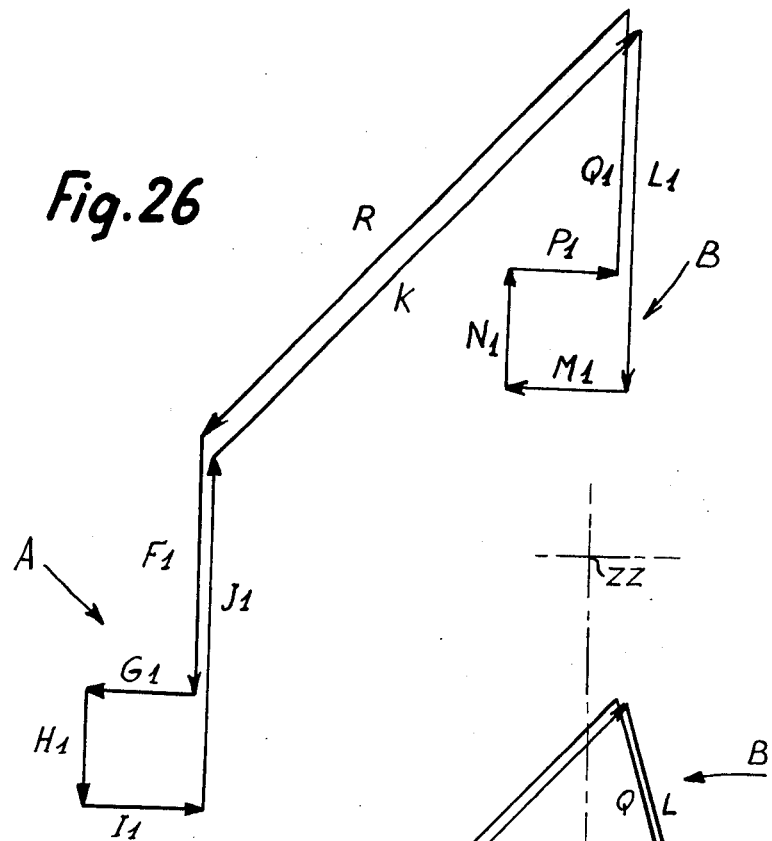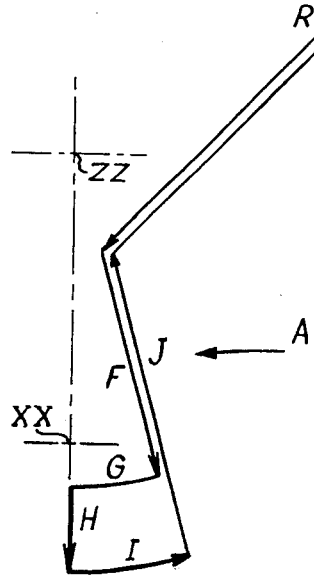

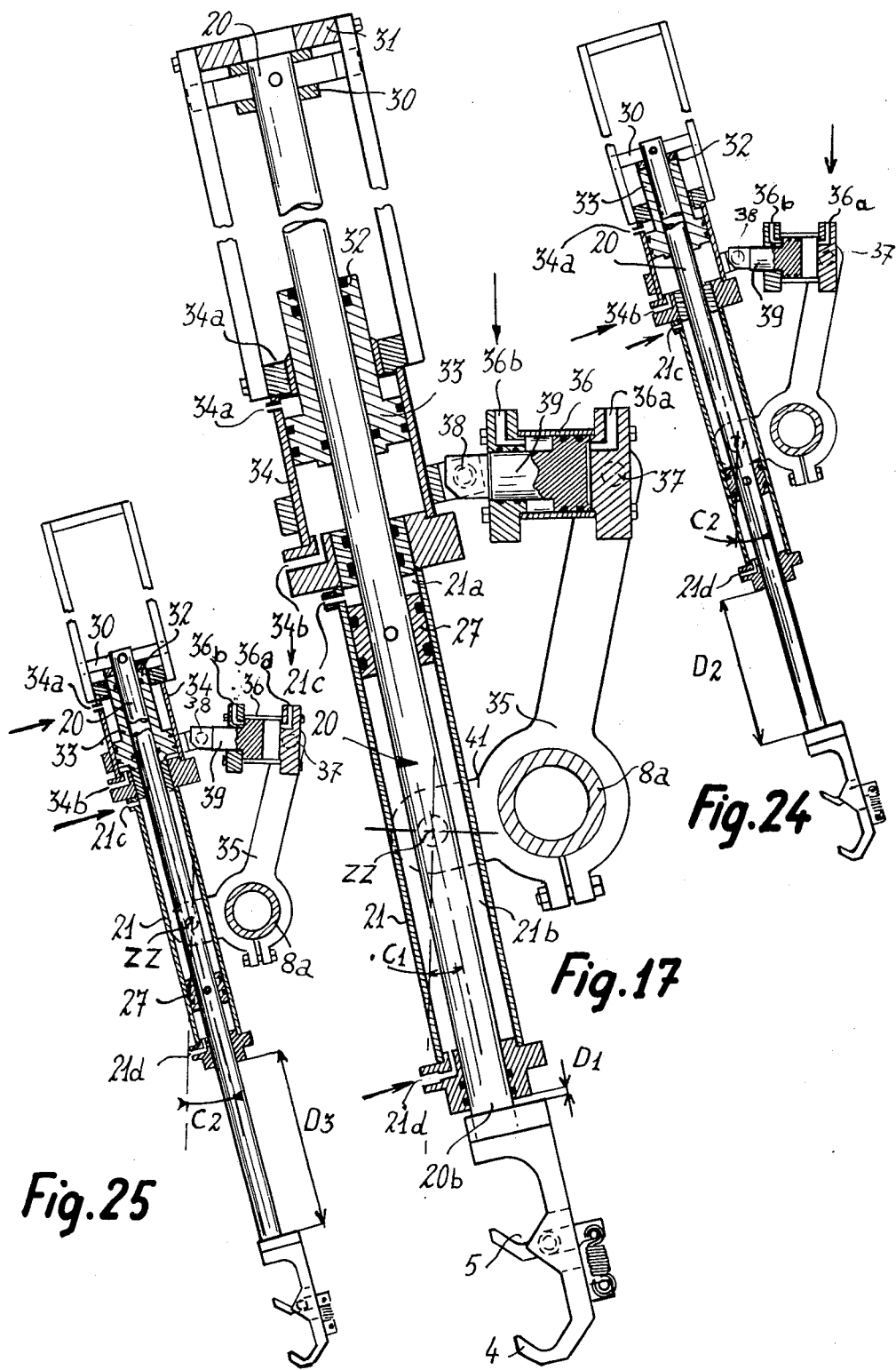

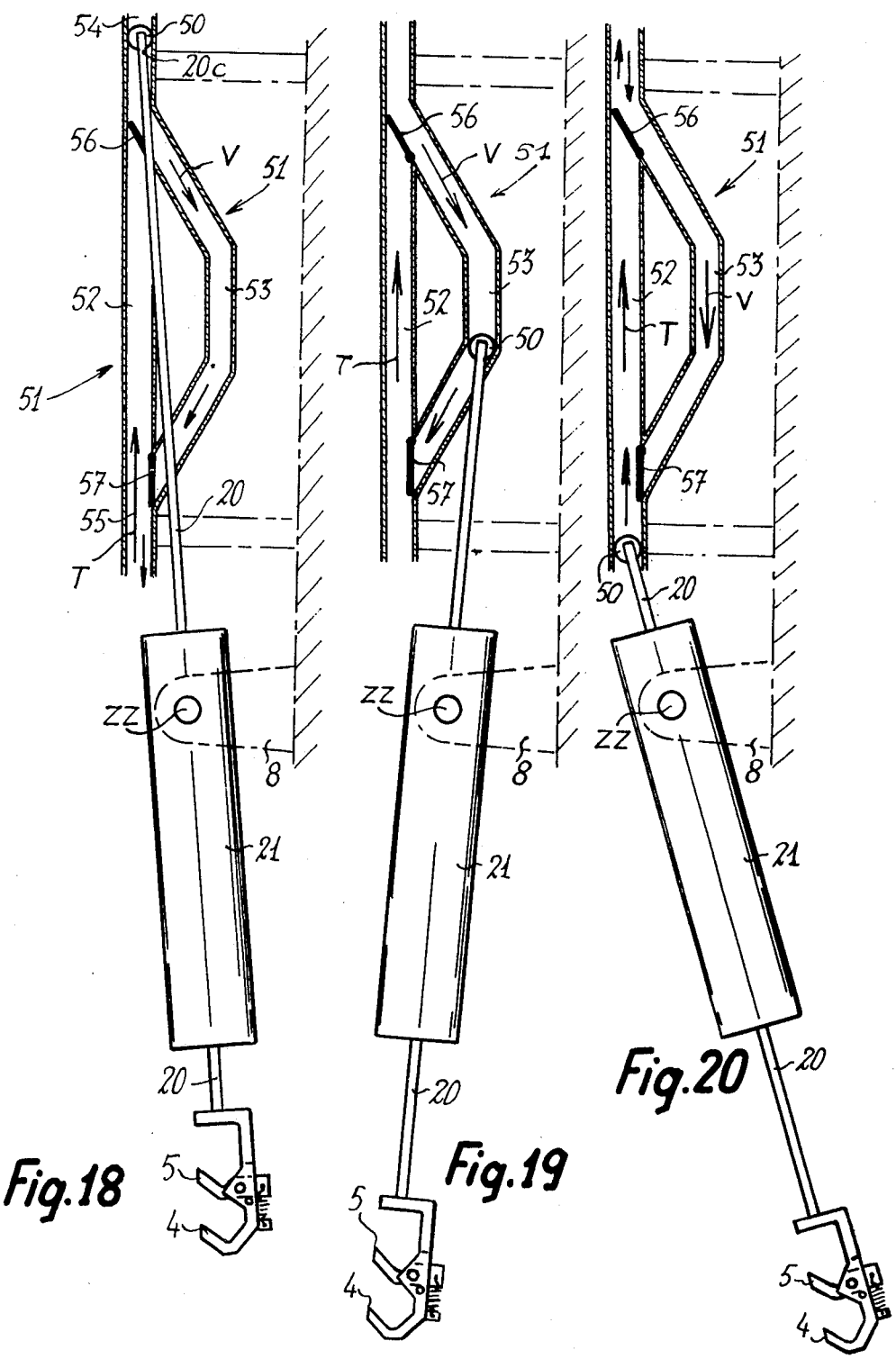

METHOD AND A DEVICE FOR THE AUTOMATIC REPLACEMENT OF A WORKPIECE TO BE MACHINED ON A MACHINE-TOOL

This invention relates to a method and a device for the automatic replacement of a finished workpiece by an unmachined workpiece on the work axis of a machine-tool or like machine and especially a machine for clamping a workpiece between centers. The invention is primarily intended to carry out automatic loading and unloading of workpieces in these machines.

The machines under consideration can be of all types such as, for example, lathes, grinding machines, burnishing machines, checking machines.

In a machining operation as in any operation performed by the machines mentioned above, it is necessary after machining to withdraw the finished workpiece from the work axis, to transfer the workpiece to a finished-workpieces magazine and to deposit the workpiece in this latter. These operations accordingly constitute the unloading process.

It is also necessary to take a fresh unmachined workpiece from the corresponding magazine, to transfer it to the work axis and mount it in position on said axis in place of the above-mentioned finished workpiece. These operations accordingly constitute the loading process.

In the case of lightweight workpieces, these operations are sometimes performed by hand, which is a laborious task for the operator and results in appreciable waste of time. In the case of heavy workpieces, lifting means become necessary and make it very difficult to provide for the non-automatic replacement of workpieces.

Devices of known types make use of two separate equipment units which are usually fitted with handling tongs for automatic loading and unloading of workpieces in a machine. Devices of this type are complicated and therefore costly. In fact, each equipment unit is of inherently complex design and the device must be provided in addition with control mechanisms for ensuring synchronization of their movements. Furthermore, the equipment units cannot both be at the same station on the work axis at the same time and interferences between these two units result in dead times of considerable length which reduce the productivity of the machine which is being served.

The method and device in accordance with the invention are intended to overcome the disadvantages mentioned in the foregoing by making it possible to carry out all unloading and loading operations automatically while reducing dead times to a minimum.

In accordance with the invention, the method for automatic replacement of a finished workpiece by an unmachined workpiece on the work axis of a machine-tool or the like in which the workpiece is clamped between centers consists in displacing two superposed and rigidly associated cradles respectively for loading the unmachined workpiece and for unloading the machined workpiece along a predetermined path between a magazine for unmachined workpieces, a one for finished workpieces and the work axis. The method is distinguished by the fact that the path of travel is inscribed in a plane at right angles to the work axis, the cradles being oriented in a direction parallel to said axis and that, as a result of successive movements of translation in said plane, the cradles are moved towards the work axis, the unloading cradle is brought into position beneath the finished workpiece which is released in order to ensure that said workpiece drops into the unloading cradle under the action of gravity, the two cradles are displaced so as to bring the unmachined workpiece into position along the work axis on which it is placed between centers, whereupon the two cradles are moved away from the work axis.

The unmachined workpiece which had initially been placed on the loading cradle is thus transferred on the work axis whilst the finished workpiece is withdrawn from the work axis and placed on the unloading cradle. These operations entail the need for only three movements of the cradles, thus reducing to a minimum the problems of synchronization of movements and the stationary period of the machine.

It is preferably ensured that the two cradles which have been moved away from the work axis are then brought into position above a magazine for finished workpieces and lowered in such a manner as to ensure that the unloading cradle is placed astride said magazine and deposits the finished workpiece therein. When the workpiece has been deposited, the two cradles can then be displaced so as to bring two supports forming part of the loading cradle into position on each side and beneath a magazine for unmachined workpieces, the two cradles are then displaced upwards so that the loading cradle lifts an unmachined workpiece from the magazine and are then moved away from said magazine in order to return them to the starting position in which the loading cradle carries the unmachined workpiece.

The operations involving replacement of workpieces in the machine are thus completed by reloading operations in a cycle which permits complete automation of successive stages of handling of workpieces which are necessary for the operation of the machine.

The invention is also directed to a repetitive process for the automatic and cyclic replacement of a finished workpiece by an unmachined workpiece on the work axis of a machine-tool or the like and especially a machine in which a workpiece is clamped between centers. The process is distinguished by the fact that two superposed and rigidly associated cradles are brought into position opposite a magazine for unmachined workpiece and that one of said cradles is loaded by extracting an unmachined workpiece from the magazine aforesaid, that the finished workpiece is collected under the action of gravity in the other cradle which has been brought into position directly beneath said workpiece, and that the cradle which carries the unmachined workpiece is brought on the work axis on which said workpiece is clamped in position, and that the machined workpiece is removed by depositing in a second magazine.

By means of the sequence of handling operations described above, the machine to be served can be integrated in a production line between an upstream machine which supplies the magazine for unmachined workpieces and a downstream machine which is supplied by the magazine for finished workpieces.

Also in accordance with the invention, the device which is primarily intended to carry out the method described above comprises a frame for supporting two superposed and rigidly associated cradles each capable of receiving and supporting a workpiece and means for simultaneously displacing the two cradles both vertically and transversely with respect to the axis of said cradles.

Each cradle is preferably provided with two lateral V-shaped supports for the corresponding workpiece, said two supports being separated by a central clearance space so that the cradles can thus be placed astride devices such as those which constitute the depositing zone of a magazine.

In a preferred embodiment, the two cradles are carried by a main jack having three positions and mounted on a system which is capable of moving with respect to the frame, the jack being rotatably mounted on the moving system about an axis substantially parallel to the horizontal axis of the cradles, the main jack and the moving system being accordingly coupled to each other by means of an inclining jack having two positions. The possibilities of rotational motion and translational motion as thus defined make it possible with the minimum number of means to place the cradles in the different positions with respect to the work axis in order to ensure the practical application of the method.

Correlatively, the moving system can be so designed as to be displaceable with respect to the frame between a position of replacement in which the cradles are close to the work axis of the machine and substantially parallel thereto and a position of reloading in which the cradles are placed transversely opposite to a magazine for unmachined workpieces and to a magazine for finished workpieces. Accordingly, these two magazines can advantageously be provided with two superposed rolling tracks which are inclined in opposite directions and the width of which is smaller than that of the central clearance space between the cradle supports, the lower rolling track being such as to form part of the finished-workpieces magazine whilst the upper rolling track forms part of the unmachined-workpieces magazine and terminates in a stop.

The angle of slope of the magazines thus formed makes it possible under the action of gravity and without entailing the need for any complex mechanism to supply the magazine with unmachined workpieces and to discharge finished workpieces.

Further distinctive features and advantages of the invention will become apparent from the following description, reference being made to the accompanying drawings in which a number of embodiments of the method and the device in accordance with the invention are illustrated, and in which:

FIGS. 10 to 15 are diagrammatic views also taken along the axis of the cradles and showing the successive positions of these latter with respect to the magazines during the operations involved in taking and depositing workpieces;

Figure 1:
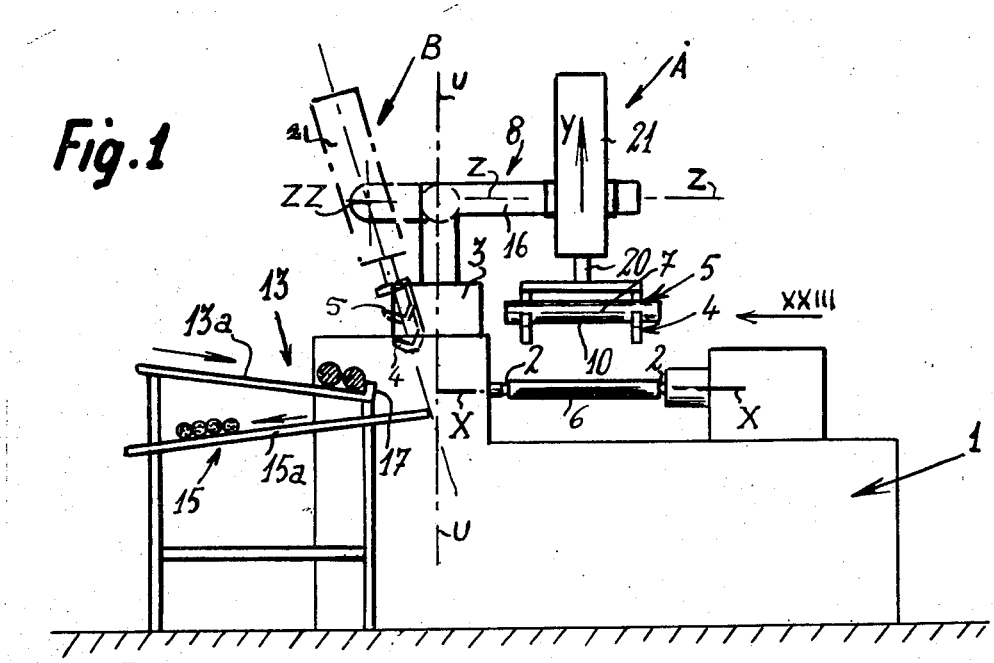
FIG. 1 is a view in elevation showing a first embodiment of the invention and of the machine to be served.
Figure 23:
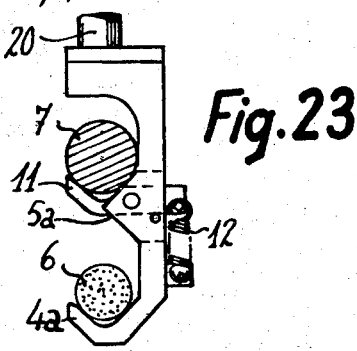
Figure 21:
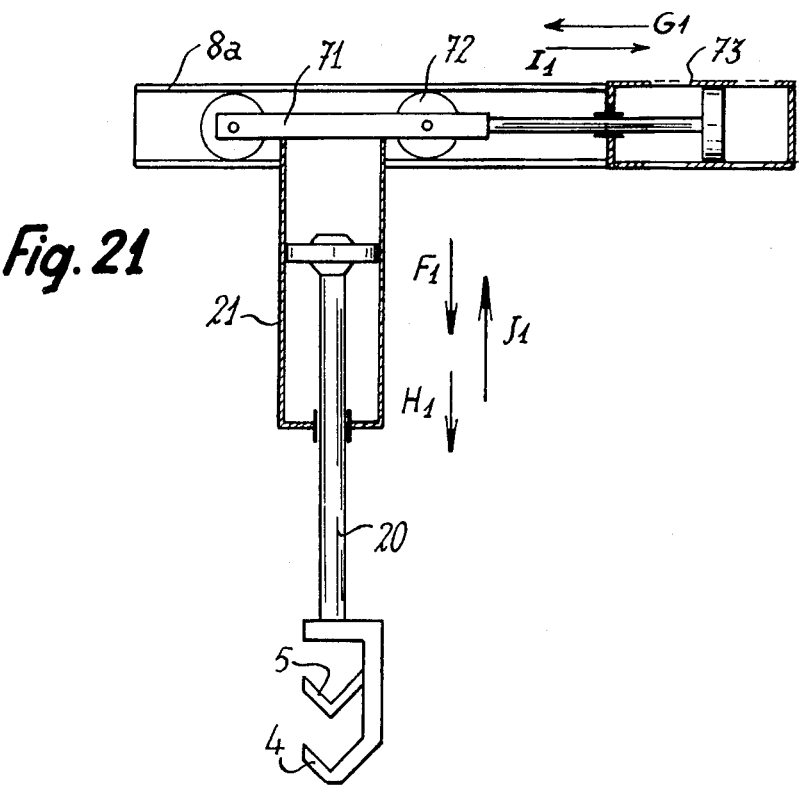
Figure 22:
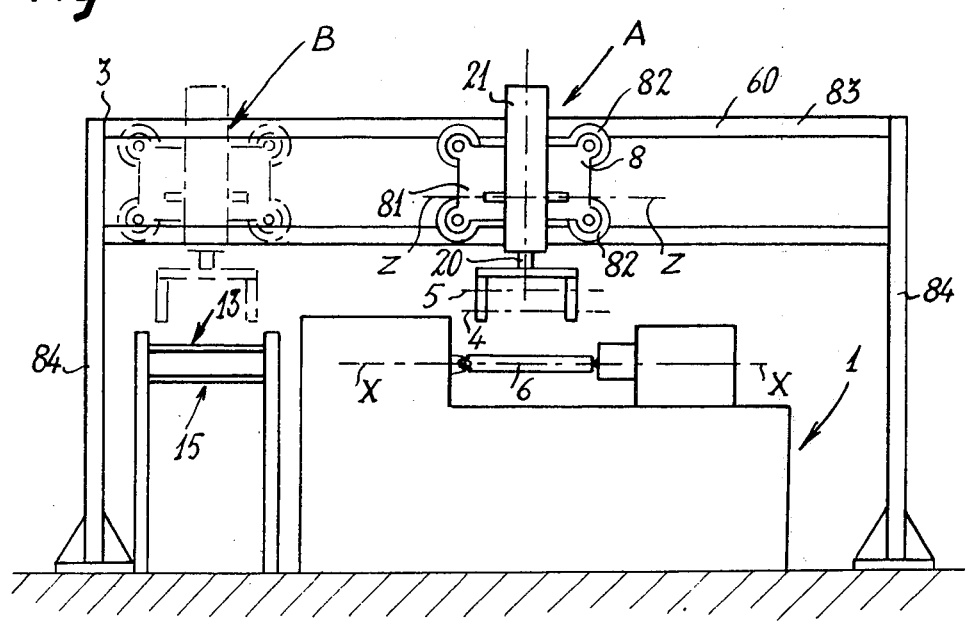

the diagram of FIG. 16 shows the successive movements of the cradles during a complete cycle of operation of the device;

FIG. 17 shows a particular embodiment of the main jack and of the cradles, this view being shown in longitudinal cross-section at right angles to the axis of articulation;

FIGS. 18 to 20 are diagrammatic views showing three positions of a second embodiment of the angular control of the cradles;

FIG. 21 is a diagrammatic view showing a third embodiment of the cradle assembly;

FIG. 22 is a view in elevation showing another embodiment of the invention;

FIG. 23 is a side view taken along the line XXIII of FIG. 1 and showing the cradle supports of the embodiment of FIG. 1;

FIGS. 24 and 25 are views to a smaller scale and showing two particular positions of the device of FIG. 17;

FIG. 26 is a diagram of the movements of the device of FIG. 22 at the time of application of the method in accordance with the invention.

Figure 2:
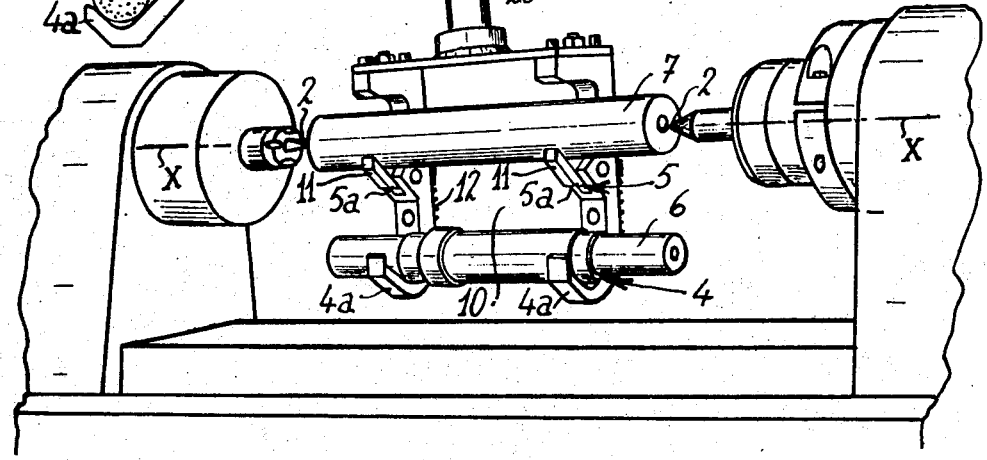
FIG. 2 is a perspective view showing the two cradles of the device of FIG. 1 at the moment when the unmachined workpiece is located opposite to the work axis before being fixed in position on this latter.

The device for carrying out the method in accordance with the invention as shown in FIGS. 1 and 2 serves a machine 1 such as a lathe, for example, which has a substantially horizontal work axis X—X defined by two centers 2 between which the workpieces to be machined are clamped.

The device under consideration comprises a frame 3 which is stationary with respect to the floor on which is mounted a moving system 8 for supporting an assembly of two superposed and rigidly associated cradles, namely a lower unloading cradle 4 and an upper loading cradle 5 which are substantially horizontal and parallel to each other. Each cradle 4 and 5 is capable of receiving a finished workpiece 6 or an unmachined workpiece 7 and the device comprises means for simultaneously displacing the two cradles 4 and 5 both in height in a variable direction Y having a component of vertical movement and transversely with respect to the bearing axes of said cradles 4 and 5 by rotational motion about an upper horizontal axis Z—Z.

In accordance with the embodiment which is illustrated, each cradle 4 and 5 has two V-shaped lateral supports 4a and 5a (shown in FIGS. 2 and 23) which are located opposite to each other and are separated by a free central clearance space 10 which is common to both cradles. The workpieces 6 and 7 which are placed on the cradles 4 and 5 therefore rest on these latter only in the vicinity of their extremities whilst their central portions are free. The V-shaped portions of the upper supports 5a each have a downwardly retractable outer arm 11 which is pivotally mounted on the corresponding support 5a about an axis substantially parallel to the cradle and is restored by means of a spring 12 having a sufficient force to counterbalance the action produced by the weight of the workpiece 7 on said arm 11.

The moving system 8 is displaceable with respect to the frame 3 and capable of moving from a positioning or replacement location A to a reloading location B as shown respectively in full lines and chain-dotted lines in FIG. 1.

In position A, the cradles 4 and 5 are close to the work axis X—X of the machine 1 to which they are substantially parallel and the axis Z—Z is located above the axis X—X. In position B, the cradles 4 and 5 are located at a distance from the work axis and placed opposite to two superposed magazines, namely a magazine 13 for unmachined workpieces and a magazine 15 for finished workpieces, said cradles being placed transversely with respect to said magazines.

In the embodiment which is illustrated, the moving system 8 comprises a support bracket 16 rotatably mounted on a vertical axis U—U with respect to the frame 3 and the positions A and B correspond to two orientations of the support bracket 16 which are relatively displaced through an angle of 90° with respect to each other and obtained by rotation about the axis U—U.

Two rolling tracks 13a and 15a which are superposed and oppositely inclined with respect to each other form part respectively of the magazines 13 and 15, the track 13a being placed above the track 15a. The widths of the tracks are smaller than that of the central clearance space 10 formed between the supports 4a and 5a of the cradles 4 and 5 so that these latter can accordingly be placed astride said tracks.

When the moving system is in position B, the slope of the track 13a is directed towards the cradles 4 and 5 whilst the slope of the track 15a is directed away from these latter and said track 13a terminates in a stop 17 against which the unmachined workpieces 7 are stacked together.

FIGS. 3 to 16 show diagrammatically the practical application of the method within the field of application of the particular device which has just been described. In this version, the cradles 4 and 5 are carried by an operating rod 20 of a jack 21 which is rotatably mounted on the moving system 8 about the axis Z—Z. Provision is made for means which make it possible on the one hand for the jack 21 to take up two positions at two different angles of slope, namely an angle $C_1$ which is close to the vertical and an angle $C_2$ which is oriented obliquely. On the other hand, means are provided for enabling the operating rod 20 to take up three positions in translational motion with respect to the jack 21 and corresponding respectively to a minimum extension $D_1$, an intermediate extension $D_2$ and a maximum extension $D_3$.

The method in accordance with the invention entails on the one hand replacement operations as shown diagrammatically in FIGS. 3 to 9 and carried out in position A of the moving system and re-supply or reloading operations as shown in FIGS. 10 to 15 in which the moving system is located in position B.

Figure 3:
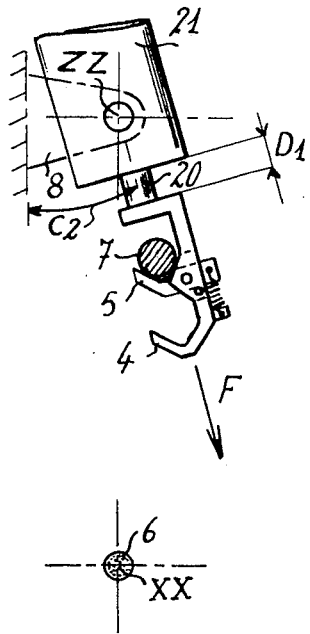
FIGS. 3 to 9 are diagrammatic side views taken along the axis of the cradles and showing the successive positions of these latter with respect to the work axis during the replacement operations.

At the beginning of the replacement operations, the device is in the position shown in full lines in FIG. 1 and in FIG. 3. The finished workpiece 6 to be removed is on the work axis X—X and the cradle 4 is unoccupied whilst the unmachined workpiece 7 to be mounted is placed on the cradle 5. The jack 21 and the operating rod 20 are respectively at the position of inclination $C_2$ and in the position of extension $D_1$.

Figure 4:
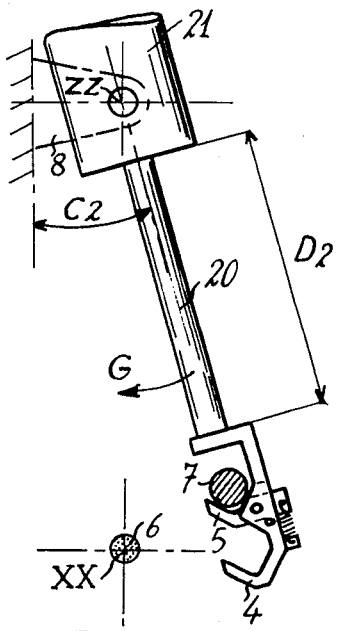

The cradles 4 and 5 are then brought opposite to the axis X—X by means of a downward movement of translation F (shown in FIG. 16) by causing the extension of the operating rod 20 to move from position $D_1$ to position $D_2$ (as shown in FIG. 4). The unoccupied cradle 4 is then engaged beneath the finished workpiece 6 mounted on the axis X—X by means of a movement of rotation G from $C_2$ to $C_1$ so as to reach the position shown in FIG. 5. The workpiece 6 is then released, for example by moving the centers 2 away from each other so as to ensure that the workpiece falls into the cradle 4 under the action of gravity.

Figures 5, 6:
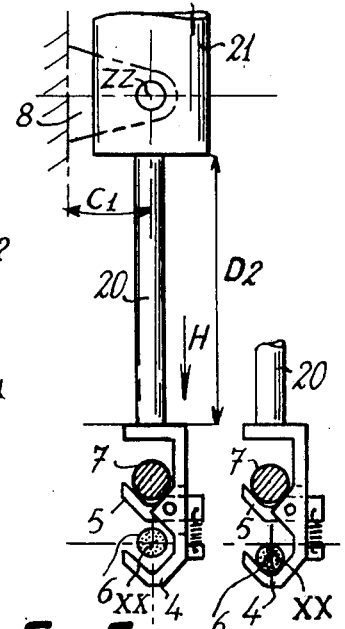

At this stage, the workpieces 6 and 7 are placed on the cradles 4 and 5 and the work axis X—X is free as shown in FIG. 6.

Figure 7:
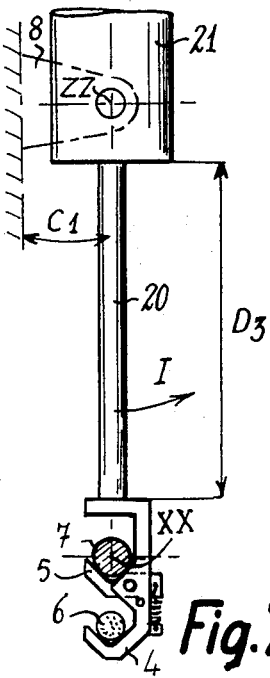
Figure 8:
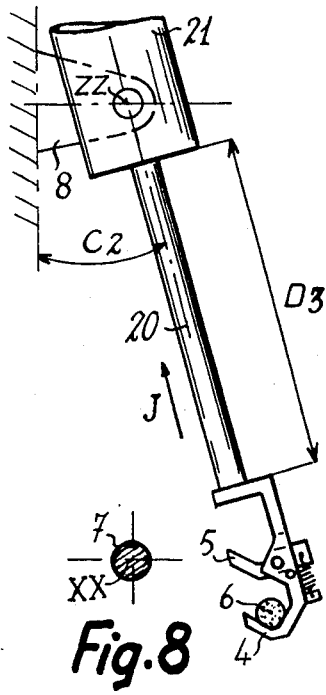
Figure 9:
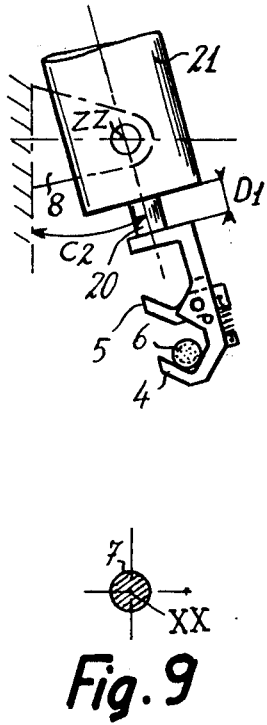

In order to bring the unmachined workpiece 7 on the axis X—X, the extension of the operating rod 20 is displaced from $D_2$ to $D_3$, thus imparting to the cradles 4 and 5 a downward movement of vertical translation H and achieving the configuration shown in FIGS. 2 and 7. Said workpiece 7 is then fixed in position on the axis X—X, for example by closing the centers 2. Finally, the cradles 4 and 5 are moved away from the axis X—X in a movement of rotation I of the jack 21 from $C_1$ to $C_2$ which is opposite to the above-mentioned movement of rotation G, followed by an upward movement of translation which returns the cradles 4 and 5 from the extension $D_3$ to the extension $D_1$ so as to take up the positions shown in FIG. 8 (after the movement of rotation I) and in FIG. 9 (after the movement of translation J). During the movement of rotation I, the workpiece 7 is maintained on the axis X—X and is released from the cradle 5, the arms 11 of which withdraw.

The unmachined workpiece 7 is then secured on the axis X—X in the position which the finished workpiece 6 had initially occupied. Said finished workpiece is placed on the cradle 4 which is returned to the position which it had occupied at the outset as shown in FIG. 3. At this stage, the replacement operations are completed.

It has been considered in the figures that the upper cradle 5 was the loading cradle and that the lower cradle 4 was the unloading cradle. If the contrary is actually the case, then it should be noted that the replacement operations can be performed with equal ease since the movements F, G, H, I, J take place simply in the direction opposite to that described in the foregoing.

In order to carry out the reloading operations shown in FIGS. 10 to 15, the moving system 8 is transferred to position B opposite to the magazines 13 and 15 in a movement indicated at K in FIG. 16. This movement is represented diagrammatically as a movement of translation but can be of any other kind such as, for example, a movement of rotation of the support bracket 16 through an angle of 90° about the axis U—U in the device shown in FIG. 1.

On completion of the movement K, the cradles 4 and 5 are placed above the rolling tracks 13a and 15a (as shown in FIG. 10) and the cradle 4 carries the finished workpiece 6. Said cradles 4 and 5 are then lowered in the movement of translation L (FIG. 16) by changing the extension of the operating rod 20 from $D_1$ to $D_3$ and the supports 4a of the cradle 4 are accordingly placed astride the rolling track 15a which engages within the clearance space 10 and thus receives the workpiece 6 as shown in FIG. 11. The workpiece 6 then rolls down the slope of said track 15a in the direction of the arrow S under the action of gravity and moves away from the cradle 4 which is thus released.

The two cradles 4 and 5 are then displaced transversely in the direction M as a result of transition from the inclination $C_2$ to the inclination $C_1$, with the result that the supports 5a of the cradle 5 are located on each side of and beneath the unmachined workpiece magazine 13 in vertically opposite relation to a fresh unmachined workpiece 7a which is applied against the stop 17 under the action of gravity (as shown in FIG. 12). The upward movement of translation N which corresponds to upward displacement of the operating rod 20 from $D_3$ to $D_2$ then has the effect of placing the cradle 5 in contact with the workpiece 7a and of lifting this latter so as to terminate in the position shown in FIG. 13. Finally, a movement of rotation P of the jack 21 from $C_1$ to $C_2$ (as shown in FIG. 14) followed by a movement of translation Q of the operating rod 20 from $D_2$ to $D_1$ has the effect of moving the cradles 4 and 5 away from the magazine 13 and bringing them into the position shown in FIG. 15.

The two cradles 4 and 5 have thus returned to the position shown in FIG. 12 which they had occupied at the outset of reloading operations, a fresh unmachined workpiece 7a being now in position on the cradle 5 and the cradle 4 being unoccupied after removal of the finished workpiece 6 which had initially been carried by this latter and which is deposited on the magazine 15.

It is consequently only necessary to subject the moving system 8 to a movement R which is opposite to the above-mentioned movement K in order to return the system to position A in the configuration shown in FIG. 3. There has thus been performed a closed cycle during which the unmachined workpiece 7 has been mounted on the axis X—X, the finished workpiece 6 has been removed therefrom and deposited on the magazine 15 and a fresh unmachined workpiece 7a which has been taken from the magazine 13 is in readiness on the loading cradle 5.

The method in accordance with the invention therefore makes it possible to carry out all the functions which are necessary for circulation of workpieces processed in series by the machine 1. In fact, each workpiece is taken successively by the cradle 5 from the magazine 13 in the form of an unmachined workpiece 7, is brought to the work axis X—X on which it is mounted, converted to a finished workpiece 6 by the machine 1, collected on the cradle 4 under the action of gravity and discharged by deposition on the magazine 15.

If the finished workpiece 6 is subsequently intended to undergo a further machining operation or checking operation on another machine, the method in accordance with the invention makes it possible to carry on with a further automatic handling cycle by making use of a second pair of cradles for supplying this other machine from the magazine 15 which is employed as an unmachined workpiece magazine. Fully automatic transfer of workpieces can thus be effected in a workshop from one machine to another.

The method in accordance with the invention does not entail any displacement of the cradles 3 and 4 in the empty state, thus reducing idle periods to a maximum by suppressing any movement which serves no useful purpose.

In particular, the replacement of the workpiece 6 by the workpiece 7 on the work axis X—X entails only a very short stationary period of the machine 1. Apart from incompressible periods (stopping of the spindle, slackening-off of the centers 2, re-tightening of the centers 2, re-starting of the spindle), this stationary period in fact includes only the time-duration of the single movement of translation H. This fact permits a considerable increase in production efficiency of the machine 1 compared with the performance which is permitted by the known technique.

In the embodiment shown in FIG. 17, the operating rod 20 passes through the jack 21 at each end of this latter. The lower portion 20b of the rod supports the cradles 4 and 5 whilst an annular shoulder 30 rigidly fixed to the upper end of the rod cooperates with a top abutment member 31 which is rigidly fixed to the jack 21 and with a bottom abutment member 32 having two positions.

The jack 21 is of the double-acting type and has two pressure chambers 21a, 21b which are supplied respectively with fluid under pressure through the orifices 21c and 21d and are separated by an annular piston 27.

The bottom abutment member 32 is rigidly fixed to a piston 33 of an auxiliary jack 34 having two positions, said jack being in parallel and coaxial relation to the jack 21.

Two orifices 34a and 34b serve respectively to put the top face and the bottom face of the piston 33 under pressure, the action surfaces of said piston being larger than those of the piston 27.

A supporting arm 35 which is rigidly fixed to the moving system 8 (having a circular cross-section 8a in the zone of attachment) defines the axis Z—Z of articulation of the jack 21 by means of a yoke 41, said jack 21 being pivotally mounted between the arms of said yoke.

An inclining jack 36 connects the supporting arm 35 to the auxiliary jack 34 on which it is pivotally mounted respectively at 37 by means of its body and at 38 by means of its movable operating rod 39. The jack 36 can take up two positions each corresponding to the supply of fluid under pressure through one of the two orifices 36a and 36b.

The different possible positions of the device thus constituted with respect to the moving system 8 are illustrated in FIGS. 17, 23 and 24.

In FIG. 17, the orifices 21d and 36b are supplied with fluid under pressure whilst the orifices 21c and 36a are not under pressure. The inclining jack 36 is consequently retracted and the jack 21 assumes the working angle of slope $C_1$. Furthermore, the operating rod 20 is retracted to the minimum extension $D_1$ whilst the annular shoulder 30 is in contact with the abutment member 31.

In FIGS. 24 and 25, the orifices 21d and 36b are on the contrary under zero pressure whilst the orifices 21c and 36a are put under pressure. The jack 36 then moves the pivot-pins 37 and 38 away from each other and the jack 21 assumes the angle of slope $C_2$. Furthermore, the annular shoulder 30 comes into contact with its bottom abutment member 32. When the orifice 34b is supplied with pressure as in FIG. 24, said abutment member is maintained at a distance from the jack 21 under the action of the auxiliary jack 34 and the operating rod 20 of said jack takes up the position of intermediate extension $D_2$. Conversely, when the orifice 34a is supplied with pressure (as shown in FIG. 25), the piston 33 is returned towards the jack 21, the operating rod of which can then reach the position of maximum extension $D_3$.

The positions of the jacks 21, 34 and 36 are controlled independently and the cradles 4 and 5 are capable of taking up six positions with respect to the moving system 8 by combining the two angles of inclination $C_1$ and $C_2$ and the three extensions $D_1$, $D_2$, $D_3$, thus enabling them to perform all the movements of the method in accordance with the invention as described in the foregoing.

These six positions are accordingly obtained in a very simple manner without entailing the need for any complex control system by making use of a standard compressed-air supply network or a conventional hydraulic circuit.

The method and the device in accordance with the invention are not limited to the forms of construction which have just been described and many alternative forms can accordingly be contemplated.

The extension of the operating rod 20 could thus assume more than three values and could even be subjected to continuously controlled operation. This would make it possible to modify the relative positions of the magazines 13 and 15 and of the cradles 4 and 5 or again to suppress the articulation of the arms 11 of the cradle 5.

In accordance with the alternative form of construction shown in FIGS. 18 to 20, the operating rod 20 which passes through the jack 21 is provided at the upper end 20c with a roller 50 engaged in a guide track 51 comprising an ascending "outstroke" arm 52 and a descending "return-stroke" arm 53, said arms being displaced transversely with respect to the axis Z—Z.

The track 51 further consists of a common upper portion 54 and a common lower portion 55 to which the arms 52 and 53 are connected by means of switches fitted with articulated gates 56 and 57. The position of equilibrium of the gate 56 indicated in the figures has the effect of orienting the roller 50 on the arm 53 from the common upper portion 54 (arrows V) whilst the gate 57 has the effect of orienting the roller 50 towards the arm 52 from the common lower portion 55 (arrows T).

The displacements of the operating rod 20 in translational motion with respect to the jack 21 therefore initiate movements of rotation of this latter about the axis Z—Z with respect to the moving system 8 and the resultant oblique movements make it possible to carry out the different stages of the method in accordance with the invention without any need to make use of an inclining jack.

In an alternative form of construction, the unitary displacements of the cradles 4 and 5 at the positioning station A can be constituted by vertical movements of translation $F_1$, $H_1$, $J_1$ (FIG. 26) and horizontal movements of translation $G_1$ and $I_1$ instead of oblique movements of translation having vertical components F, H, J (FIG. 16) and movements of rotation G and I about a horizontal axis.

Similarly, provision can be made at the reloading station B for a series of vertical movements of translation $Q_1$, $N_1$, $L_1$ and of horizontal movements of translation $P_1$, $M_1$.

A device of the type shown in FIG. 21 can be employed in order to ensure a unitary cycle of this type at the stations A and B. The body of the jack 21 which carries the double cradle 4, 5 is supported in this case by a carriage 71 fitted with rollers 72 and capable of moving along a track 8a such as a steel sectional member. The position of the carriage 71 along the track 8a is controlled by a jack 73 which is mounted at the end of this latter and the sliding rod of which is connected to the carriage 71.

It is clear that the jack 21 ensures the movements $F_1$, $H_1$, $J_1$ or $Q_1$, $N_1$, $L_1$ whereas the jack 50 controls the movements $G_1$, $I_1$ or $P_1$, $M_1$.

Any means can be provided for displacing the track 8a which forms part of the moving system and causing said track to move from station A to station B (displacement K shown in FIG. 26) or conversely (displacement R).

The device of FIG. 22 comprises an assembly for the pivotal motion of the control jack 21 about a horizontal axis Z—Z and supported by a carriage 81 which constitutes in this case the moving system for transferring the double cradle 4, 5 from station A to station B. The displacement of the carriage 81 corresponds in this case to a movement of translation in contrast to the movement of rotation about the axis U—U as contemplated in FIG. 1.

To this end, the carriage 81 comprises four rollers 82 mounted between two parallel rails 83 carried by upright members 84. The rails 83 are placed between the stations A and B in parallel relation to the axis X—X and are located in a vertical plane parallel to the vertical plane which passes through the axis X—X.

The invention can also be adapted to a very wide variety of positional arrangements of a machine-tool and of means for handling unmachined and finished workpieces.

From a comparison of FIGS. 16 and 26, it is apparent that the closed circuit described by the two cradles 4, 5 during their unitary displacements corresponds both to the work or positioning station A and to the station B for unloading and loading workpieces, that said closed circuit has the shape of the letter d and that the cradles travel in both directions along the stem of the d. This circuit is thus repeated in a similar fashion at both stations either in parallel planes or in secant planes.

It can readily be understood that the invention is not limited to the foregoing embodiments and that many alternative forms of construction could be devised for these latter. Thus the rails 83 in the embodiment shown in FIG. 22 could follow a path which is not necessarily rectilinear.

We claim:

1. A method for automatic replacement of a finished workpiece by an unmachined workpiece on the work axis of a machine-tool or the like in which the workpiece is clamped between centers, in which two superposed and rigidly associated cradles respectively for loading the unmachined workpiece and for unloading the machined workpiece are displaced along a predetermined path between a magazine for unmachined workpiece, a one for finished workpieces and the work axis, wherein the path of travel is inscribed in a plane at right angles to the work axis, the cradles being oriented in a direction parallel to said axis and wherein, as a result of successive movements of translation in said plane, the cradles are moved towards the work axis, the unloading cradle is brought into position beneath the finished workpiece which is released in order to ensure that said workpiece drops into the unloading cradle under the action of gravity, the two cradles are displaced so as to bring the unmachined workpiece into position along the work axis on which it is placed between centers, whereupon the two cradles are moved away from the work axis.

2. A method according to claim 1, wherein the unloading cradle is placed beneath the finished workpiece in a movement of translation followed by a movement of rotation of the cradles about an axis which is substantially parallel to the work axis.

3. A method according to claim 1 wherein, after replacement of the finished workpiece by an unmachined workpiece, the cradles which have then been moved away from the work axis are withdrawn in an upward movement of translation.

4. A method according to claim 1 wherein, when the finished workpiece has been deposited, the two cradles are then displaced so as to bring two supports forming part of the loading cradle into position on each side and beneath a magazine for unmachined workpieces, the two cradles are then displaced upwards so that the loading cradle lifts an unmachined workpiece from the magazine and said cradles are then moved away from said magazine.

5. A method according to claim 4, wherein the loading cradle is brought into position beneath the magazine for unmachined workpieces and moved away from said magazine in two movements of rotation carried out in opposite directions about a common horizontal axis of articulation which is substantially parallel to the axes of the cradles.

6. A method according to claim 4, wherein the two cradles are withdrawn in an upward movement of translation after having been withdrawn from the magazine for unmachined workpieces.

7. A method according to claim 4, wherein the double cradle loaded with the unmachined workpiece is brought back to the starting position.

8. A method according to claim 1, wherein the two superposed cradles are brought into position opposite the magazine for unmachined workpieces in successive movements of translation, wherein deposition of an unmachined workpiece within the loading cradle is initiated by extraction of said workpiece from the magazine aforesaid, wherein the replacement of the workpiece on the work axis is carried out and wherein the workpiece is discharged by deposition on a second magazine on the plane located at right angles to the work axis.

9. A method according to claim 1, wherein the unitary cycle of displacement of the two cradles at the work station of the workpieces corresponds to a closed circuit which assumes substantially the shape of a $d$.

10. A method according to claim 9, wherein the closed circuit described by the two cradles at the unloading and re-supply station is similar to the circuit described at the work station.

11. A device for automatic replacement of a finished workpiece by an unmachined workpiece on the work axis of a machine-tool or the like in which workpieces are clamped between centers, wherein said device comprises a frame for supporting an assembly of two superposed and rigidly associated cradles each capable of receiving a workpiece placed under the action of gravity and means for simultaneously displacing the two cradles both in height and transversely with respect to their axis in successive movements of translation which are inscribed in a plane at right angles to the work axis.

12. A device according to claim 11, wherein each of the two cradles has two lateral V-shaped supports on which the workpiece is intended to bear, said supports being separated by a central clearance space.

13. A device according to claim 12, wherein said device comprises a loading cradle in which the two V-shaped supports each have a retractable arm which can be returned to a stop position by elastic means.

14. A device according to claim 11, wherein the two cradles are carried by a main jack which is capable of displacing said cables in an upward movement of translation.

15. A device according to claim 14, wherein the main jack has an operating rod which passes through said jack for supporting the cradles at the lower portion thereof and is provided at the upper portion thereof with an annular shoulder in cooperating relation with a bottom stop having two positions and carried by the piston of an auxiliary jack placed in the line of extension of the main jack.

16. A device according to claim 14, wherein the main jack is rotatably mounted on the moving system which carries said jack about an axis which is substantially parallel to the axis of the cradles, said cradle axis being horizontal.

17. A device according to claim 16, wherein the main jack is connected to the moving system which carries said jack by means of an inclining jack having two positions.

18. A device according to claim 16, wherein the main jack has an operating rod which passes through said jack and is provided at the upper portion thereof with a roller engaged in a guide track rigidly fixed to the moving system and having an ascending "outstroke" arm and a descending "return-stroke" arm which are displaced transversely with respect to the axis of articulation, switching means being provided for transferring the roller from one arm to the other.

19. A device according to claim 14, wherein the main jack is capable of translational motion with respect to the moving system in a direction which is transverse to the axis of the cradles, said main jack being connected to two-position control means such as a jack.

20. A device according to claim 12, wherein the cradles are supported by a moving system mounted on the frame and capable of displacement with respect to said frame between a workpiece-replacement position in which the cradles are close to the work axis and substantially parallel thereto and a re-supply position in which the cradles are placed transversely opposite to a magazine for unmachined workpieces and to a magazine for finished workpieces.

21. A device according to claim 20, wherein the two magazines each have a rolling track, the track of the unmachined-workpiece magazine being placed above the other track, inclined towards the cradles when the moving system is in the re-supply position and terminating in a stop, and the track of the finished-workpiece magazine being inclined in the direction opposite to the cradles.

* * * * *